(No Model.)
J. G. BUSCH.
FEED TROUGH.
No. 596,804.　　　　　Patented Jan. 4, 1898.
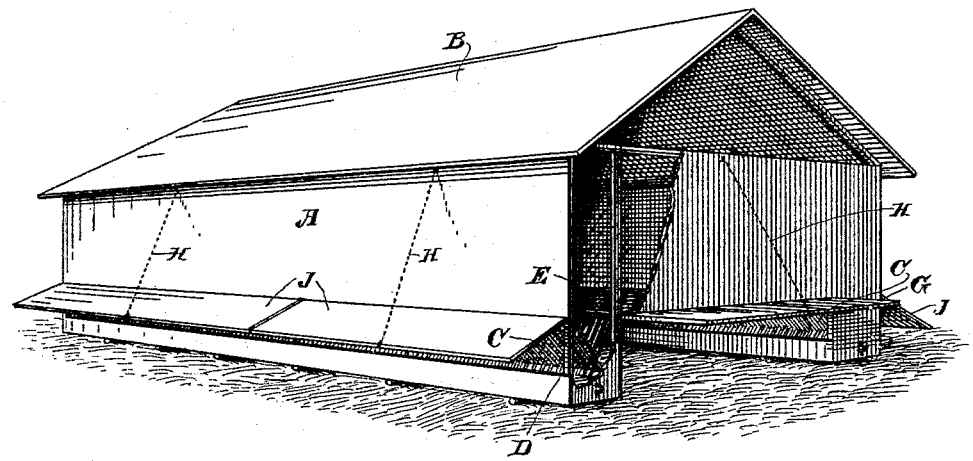
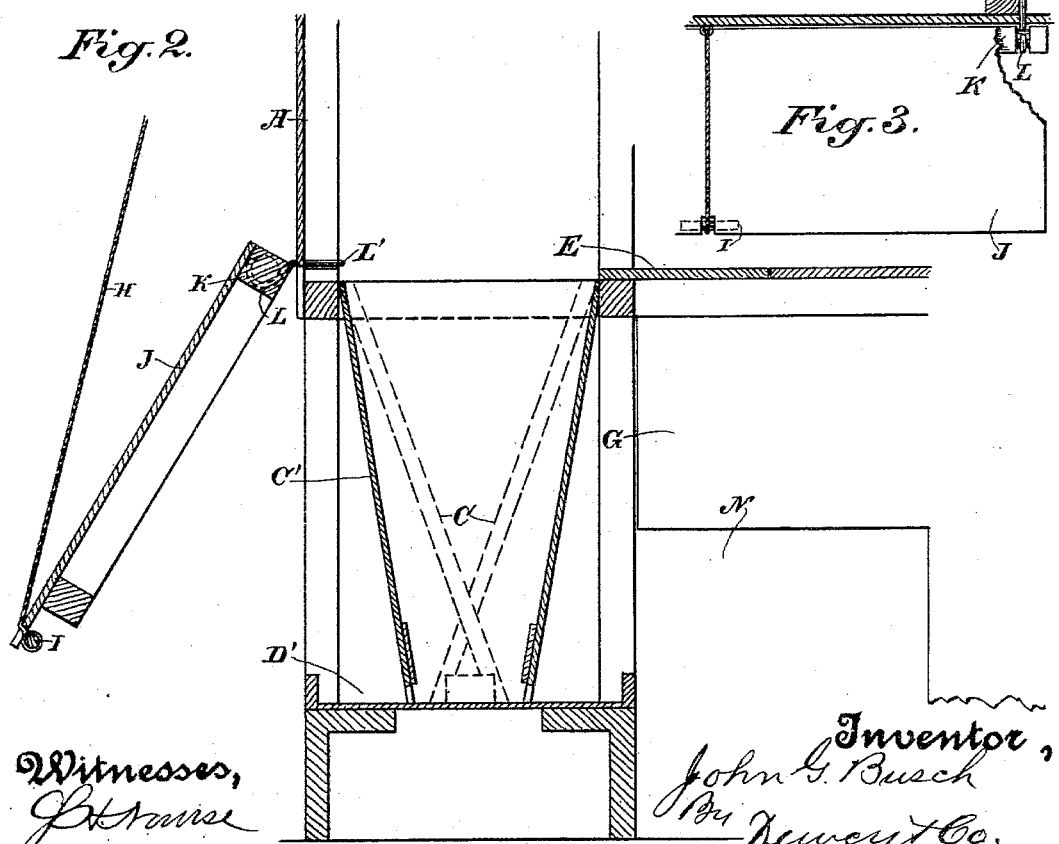
Witnesses,
Inventor,
John G. Busch
By Dewey & Co.
Attys

UNITED STATES PATENT OFFICE.

JOHN G. BUSCH, OF POTTER VALLEY, CALIFORNIA.

FEED-TROUGH.

SPECIFICATION forming part of Letters Patent No. 596,804, dated January 4, 1898.

Application filed February 25, 1897. Serial No. 624,943. (No model.)

*To all whom it may concern:*

Be it known that I, JOHN G. BUSCH, a citizen of the United States, residing at Potter Valley, county of Mendocino, State of California, have invented an Improvement in Feed and Protecting Barns for Stock; and I hereby declare the following to be a full, clear, and exact description of the same.

My invention relates to a barn or structure which is especially designed for the most economical and convenient feeding of stock of various kinds; and it is especially useful for the protection of young lambs, kids, and other tender animals just after their birth.

It consists in details of construction which will be more fully explained by reference to the accompanying drawings, in which—

Figure 1 is a view of my movable barn. Fig. 2 is a vertical section of one side of the barn. The full line shows construction when used for feeding hogs and the dotted when used for hay. Fig. 3 is a plan of one of the swinging side gates.

In carrying out my invention I make a structure of sufficient size for the amount of stock to be cared for.

In some cases it may be found convenient or practical to make the structure permanent; but I have designed it so as to be movable from place to place, so that when the ground around and beneath it has become trodden up or saturated with moisture and deposits I can by attaching a team to the structure move it far enough from its old location to provide a dry and clean location, thus moving it from time to time, as may be desired, so that the animals can be kept cleaner and in better health.

A is a structure made of suitably-connected timbers and weather-boarding, with a roof B, which will shed rain. Along each side of this structure are a series of racks C, having sloping diverging bars or rods facing outwardly and inwardly, so as to provide receptacles for hay or such feed as it is desired to place in them. Below these racks are tight boxes D, which serve for the reception of grain, roots, and other substances which could not be held in the racks and which it is desirable to feed and keep off the ground.

This structure may be provided with wheels or rollers resting upon the ground, and it may have beams projecting at the ends to provide suitable attachments for horses by which they can be employed to move the structure, as previously described. At a sufficient distance above the ground is a permanent floor E, which may be anywhere from four to six feet above the ground and serves to receive the hay, grain, or other material to be fed. The edges of this floor extend to the tops of the racks C, so that any kind of feed can be easily delivered from these outer edges into the racks or into the boxes beneath, the sides of the structure being open at their junction with the racks and the floor E for this purpose. In order to admit the stock into the space beneath, I have shown hinged swinging end gates G, which may be provided with wire or other ropes or flexible hoisting devices which are easily attached or disengaged. In the present case I have shown the twisted wires or ropes H, adapted to fit into slots or channels made in the lower edge of the door or gate, with a cross-bar I, which extends across the slot and enables the operator to raise the gate at will. When the gate is to be closed, it is only necessary to slip the cross-bar I out of the slot in the door to let the door close.

Upon the sides of the structure A, I have hinged vertically-movable swinging roofs J, which are made tight, so that when these are swung up into about the same plane with the main roof B of the structure they form protecting-sheds beneath which those cattle which are to be fed from the outside can pass, while the others which feed from the inside are admitted through the end gates or doors G, previously described. Any crowding of the animals upon the inside or outside is thus prevented, since only such a number may be admitted to the interior as can be comfortably fed without crowding and the gates then closed, the remainder being allowed to go up to the racks on the outside and under the cover of the temporary roof-sheds. If it is desired to close the device, it is only necessary to let these temporary swinging roofs down about their hinges and close up the sides of the structure. In order to suitably hinge these side doors or temporary roofs, I have shown timbers K extending out at each upper edge and made with a rounded groove to form journals around which the roof-doors are caused to swing. These journals rest in hooks L, made of stout steel, the ends being driven through the sides, and they may be bent around the posts interior thereto, as plainly shown at L'. Any suitable arrangement of wires or ropes or other devices may be employed to support these shed-roofs when open, preferably suspending ropes from above, so that there are no posts or timbers for the animals to push and rub against.

This structure is especially useful also for the care of younger animals, such as lambs, kids, small or young pigs, &c. Where pigs are to be fed, the racks may be replaced by close containing-bins C', these bins having slits or channels opening out at the bottom into either side, so as to deliver into shallow troughs D', projecting a short distance out each side of the bottom. The slits are near enough to the bottom so that only a small amount of grain will flow out of them into the boxes or troughs beneath, and the quantity which has already passed out will automatically check any further flow until it has been eaten by the animals. There will never be any large surplus in the troughs to be wasted.

The outer edges of the troughs preferably have heavy scantlings fastened along them at such a distance from the bottoms of the grain bins or holders that there is only room enough for the hogs to insert their noses while feeding, with no opportunity of throwing the grain out. Through the side or end of the structure, at any suitable point, I make a small door or opening N, which will allow the younger pigs to enter and feed from the inside undisturbed by the older and larger ones, so that all will get their due share of food.

This structure is of very great value in caring for sheep and goats with young lambs or kids just born, and which at this age are very weak and likely to perish with cold if left out during the night or during storms. By opening the end doors or gates the sheep or goats, with their lambs or kids, may be admitted, or they may be driven in before the birth of the little ones and will be entirely protected from the rain and the cold by reason of the inclosure, so that by the use of this device I have been enabled to save a large proportion, where without it the loss was formerly very great.

Another great advantage of this construction is the free access of air through the side racks, whereby a complete ventilation is kept up and light at the same time is admitted, so that the animals inside can see as well as those outside.

The whole structure is very inexpensive and makes a great saving in the feeding and care of all kinds of stock.

Having thus described my invention, what I claim as new, and desire to secure by Letters Patent, is—

1. A barn or structure consisting of a closed roof and a floor elevated above the surface of the ground, permanent sides extending from the sides of the roof and terminating about on a plane with the floor, a rack consisting of downwardly-converging bars extending along each side of the barn and extending from the floor-line downwardly, the hinged or swinging sections J of the sides forming continuations of the permanent sides and closing the entrance to the racks from the outside, and means for holding the movable sections elevated to expose the racks from the outside and to form temporary roof-sheds.

2. A barn or structure having a tight roof, sides extending downwardly to the floor, said floor being elevated above the ground to allow the entrance of animals beneath, double-faced racks composed of downwardly-converging bars extending along each side beneath the edges of the floor and boxes or troughs beneath the racks as shown, combined roof and side sections having journaled beams or pieces along the upper edges, and hooks or supports fixed in the frame-timbers of the structure for the support of said hinged timbers, wires or ropes passed into slots in the free edges of said hinged portions and cross-bars fitted to the wires or ropes whereby the hinged portion may be elevated and suspended to admit stock beneath them and form roofs for their protection while feeding.

In witness whereof I have hereunto set my hand.

JOHN G. BUSCH.

Witnesses:
S. H. NOURSE,
JESSIE C. BRODIE.